(12) United States Patent
Gao et al.

(10) Patent No.: US 12,439,385 B2
(45) Date of Patent: Oct. 7, 2025

(54) SUBFRAME TYPE NOTIFICATION AND DETERMINATION METHODS AND DEVICE

(71) Applicant: China Academy of Telecommunications Technology, Beijing (CN)

(72) Inventors: Xuejuan Gao, Beijing (CN); Xueming Pan, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 388 days.

(21) Appl. No.: 16/305,805

(22) PCT Filed: May 19, 2017

(86) PCT No.: PCT/CN2017/085132
§ 371 (c)(1),
(2) Date: Nov. 29, 2018

(87) PCT Pub. No.: WO2017/206740
PCT Pub. Date: Dec. 7, 2017

(65) Prior Publication Data
US 2019/0387521 A1    Dec. 19, 2019

(30) Foreign Application Priority Data
May 31, 2016   (CN) .......................... 201610378041.3

(51) Int. Cl.
*H04W 72/04*   (2023.01)
*H04L 5/14*    (2006.01)
(Continued)

(52) U.S. Cl.
CPC ....... *H04W 72/0446* (2013.01); *H04L 5/1469* (2013.01); *H04W 72/20* (2023.01)

(58) Field of Classification Search
CPC ......... H04W 72/0446; H04W 72/1278; H04W 72/04; H04L 5/1469; H04L 5/0053; H04L 5/0091
See application file for complete search history.

(56) References Cited

U.S. PATENT DOCUMENTS 9,036,580 B2 * 5/2015 Yin .................. H04L 1/1812
                                            370/468
9,591,660 B2 * 3/2017 Yang .................. H04L 5/0007
(Continued)

FOREIGN PATENT DOCUMENTS

CN    104137441 A    11/2014
CN    104349473 A    2/2015
(Continued)

OTHER PUBLICATIONS

Intel Corporation, "Signaling for Flexible Timing UL Scheduling," 3GPP TSG RAN WG1 Meeting #84bis, R1-162352, Busan, Korea, Apr. 11-15, 2016.
(Continued)

*Primary Examiner* — Hoang-Chuong Q Vu
(74) *Attorney, Agent, or Firm* — Foley & Lardner LLP

(57) ABSTRACT

Disclosed are a subframe type notification and determination methods and device. The invention enables a terminal to dynamically determine a subframe type, such that a subframe type can be flexibly changed to adapt to different service transmission requirements, thereby increasing system transmission efficiency. The subframe type determination method of the invention comprises: detecting, in a preset resource, indication information for determining a subframe type; and determining, according to a detection result, the subframe type.

8 Claims, 6 Drawing Sheets

(51) Int. Cl.
*H04W 72/0446* (2023.01)
*H04W 72/12* (2023.01)
*H04W 72/20* (2023.01)

(56) References Cited

U.S. PATENT DOCUMENTS

| | | | | |
|---|---|---|---|---|
| 10,779,265 | B2* | 9/2020 | Kusashima | H04L 5/1469 |
| 11,831,584 | B2* | 11/2023 | Ang | H04W 72/0446 |
| 2012/0099536 | A1* | 4/2012 | Lee | H04W 72/005 |
| | | | | 370/328 |
| 2012/0230273 | A1* | 9/2012 | He | H04W 56/0045 |
| | | | | 370/329 |
| 2013/0083706 | A1* | 4/2013 | Lin | H04L 5/001 |
| | | | | 370/280 |
| 2013/0094456 | A1* | 4/2013 | Ng | H04W 88/06 |
| | | | | 370/328 |
| 2013/0188533 | A1* | 7/2013 | He | H04L 5/0044 |
| | | | | 370/280 |
| 2013/0194980 | A1* | 8/2013 | Yin | H04L 1/1854 |
| | | | | 370/280 |
| 2013/0194982 | A1* | 8/2013 | Fwu | H04B 7/0617 |
| | | | | 370/280 |
| 2013/0329661 | A1* | 12/2013 | Chen | H04W 72/0453 |
| | | | | 370/328 |
| 2014/0029484 | A1* | 1/2014 | Choi | H04L 5/1469 |
| | | | | 370/280 |
| 2014/0056185 | A1* | 2/2014 | Yu | H04B 1/56 |
| | | | | 370/280 |
| 2014/0098732 | A1* | 4/2014 | Chen | H04W 72/23 |
| | | | | 370/312 |
| 2014/0106769 | A1* | 4/2014 | Bai | H04W 52/243 |
| | | | | 455/452.1 |
| 2014/0198733 | A1 | 7/2014 | Yin et al. | |
| 2014/0301290 | A1* | 10/2014 | He | H04L 1/1854 |
| | | | | 370/329 |
| 2015/0043434 | A1 | 2/2015 | Yamada et al. | |
| 2015/0092637 | A1* | 4/2015 | Yang | H04L 5/1469 |
| | | | | 370/296 |
| 2015/0092703 | A1* | 4/2015 | Xu | H04W 28/18 |
| | | | | 370/329 |
| 2015/0117294 | A1* | 4/2015 | Li | H04L 5/0048 |
| | | | | 370/312 |
| 2015/0124663 | A1* | 5/2015 | Chen | H04L 5/0053 |
| | | | | 370/278 |
| 2015/0188690 | A1* | 7/2015 | Khoryaev | H04L 5/0051 |
| | | | | 370/280 |
| 2015/0223216 | A1* | 8/2015 | Han | H04W 72/044 |
| | | | | 370/329 |
| 2015/0304087 | A1* | 10/2015 | He | H04B 17/24 |
| | | | | 370/280 |
| 2015/0373677 | A1* | 12/2015 | Seo | H04W 72/23 |
| | | | | 370/330 |
| 2016/0021655 | A1* | 1/2016 | Seo | H04L 1/1829 |
| | | | | 370/280 |
| 2016/0029239 | A1* | 1/2016 | Sadeghi | H04W 52/244 |
| | | | | 370/252 |
| 2016/0043849 | A1* | 2/2016 | Lee | H04W 72/042 |
| | | | | 370/329 |
| 2016/0066343 | A1* | 3/2016 | Lin | H04W 72/1205 |
| | | | | 370/336 |
| 2016/0157217 | A1* | 6/2016 | Xue | H04L 5/0044 |
| | | | | 370/330 |
| 2016/0174247 | A1* | 6/2016 | Ruiz Delgado | H04W 48/16 |
| | | | | 370/329 |
| 2016/0205690 | A1* | 7/2016 | Berggren | H04L 1/1861 |
| | | | | 370/280 |
| 2016/0338046 | A1* | 11/2016 | Chen | H04L 5/0048 |
| 2017/0019915 | A1* | 1/2017 | Nogami | H04L 5/001 |
| 2017/0111160 | A1* | 4/2017 | Chen | H04L 5/14 |
| 2017/0142701 | A1* | 5/2017 | Nishio | H04L 5/14 |
| 2017/0170944 | A1* | 6/2017 | Ang | H04W 72/042 |
| 2017/0257860 | A1* | 9/2017 | Nam | H04W 72/0446 |
| 2018/0160410 | A1* | 6/2018 | Xia | H04W 72/04 |
| 2018/0205534 | A1* | 7/2018 | Yi | H04J 3/02 |
| 2018/0242317 | A1* | 8/2018 | Marinier | H04W 56/003 |
| 2018/0316464 | A1* | 11/2018 | Stern-Berkowitz | |
| | | | | H04L 1/1657 |
| 2018/0359762 | A1* | 12/2018 | Xiong | H04W 72/0413 |
| 2019/0053274 | A1* | 2/2019 | Kim | H04W 48/16 |
| 2019/0116007 | A1* | 4/2019 | Yi | H04W 72/0453 |
| 2019/0141681 | A1* | 5/2019 | Wang | H04L 5/1469 |
| 2020/0220697 | A1* | 7/2020 | Lee | H04L 5/1469 |
| 2021/0203528 | A1* | 7/2021 | Park | H04L 25/0226 |
| 2023/0050877 | A1* | 2/2023 | Wang | H04W 72/51 |

FOREIGN PATENT DOCUMENTS

| | | |
|---|---|---|
| CN | 104639492 A | 5/2015 |
| EP | 2 983 429 A1 | 2/2016 |

OTHER PUBLICATIONS

Nokia Networks: "On DL transmission detection and UL subframe indication for LAA", 3GPP Draft; R1-155602, 3rd Generation Partnership Project (3GPP), Mobile Competence Centre; 650, Route Des Lucioles ; F-06921 Sophia Antipolis Cedex ; France, vol. RAN WG1, No. Malmo, Sweden; Oct. 5, 2015-Oct. 9, 2015 Sep. 25, 2015 (Sep. 25, 2015), XP051021337, Retrieved from the Internet: URL:http://www.3gpp.org/ftp/tsg_ran/WG1_RL1/TSGR1_82b/Docs/ [retrieved on Sep. 25, 2015].

Qualcomm Incorporated: "Frame structure and UE procedures", 3GPP Draft; R1-153872 Frame Structure and Ue Procedures, 3rd Generation Partnership Project (3GPP), Mobile Competence Centre ; 650, Route Des Lucioles ; F-06921 Sophia-Antipolis Cedex ; France, vol. RAN WG1, No. Beijing, China; Aug. 24-2015-Aug. 28, 2015 Aug. 23, 2015 (Aug. 23, 2015), XP051001308, Retrieved from the Internet: URL:http://www.3gpp.org/ftp/Meetings_3GPP_SYNC/RAN1/Docs/ [retrieved on Aug. 23, 2015].

* cited by examiner

SUBFRAME TYPE NOTIFICATION AND DETERMINATION METHODS AND DEVICE

This application is a National Stage of International Application No. PCT/ON2017/085132. filed May 19. 2017, which claims the priority of Chinese Patent Application No. 201610378041.3, filed with the Chinese Patent Office on May 31, 2016, and entitled "A method and apparatus for notifying a subframe type, and a method and apparatus for determining a subframe type", both of which are hereby incorporated by reference in their entireties.

FIELD

The present invention relates to the field of communications, and particularly to a method and apparatus for notifying a subframe type, and a method and apparatus for determining a subframe type.

BACKGROUND

The Frame Structure Type 1 (FS1) is applicable to the existing Long Term Evolution (LTE) Frequency Division Duplex (FDD) system, and FIG. 1 illustrates a schematic structural diagram of the FS1. In the FDD system, there are different carrier frequencies in, and the same frame structure for, uplink and downlink transmission. A radio frame with the length of 10 ms over each carrier includes ten 1 ms subframes, and each subframe includes two timeslots with the length of 0.5 ms. A Transmission Time Interval (TTI) for transmitting uplink and downlink data is 1 ms.

As there is a growing demand for a bandwidth in wideband mobile communication, the Time Division Duplex (TDD) mode which is one of two general duplex modes has earned more and more attention. In the TDD system, uplink and downlink signals are transmitted in different subframes, at the same frequency, for uplink and downlink transmission. The Frame Structure Type 2 (FS2) is applicable to the existing TDD system, and FIG. 2 illustrates a schematic structural diagram of the FS2, where a radio frame with the length of 10 ms includes two 5 ms half-frames, and each half-frame includes five subframes with the length of 1 ms. Each half-frame includes at least one downlink subframe, at least one uplink subframe, and at most one special subframe. The subframes in the TDD frame structure are categorized into downlink subframes, uplink subframes, and special subframes, where each special subframe includes three components of a Downlink Pilot Time Slot (DwPTS), a Guard Period (GP), and an Uplink Pilot Time Slot (UpPTS), where a downlink pilot, downlink traffic data, and downlink control signaling can be transmitted in the DwPTS; no signal is transmitted in the GP; and only a random access signal and an uplink pilot signal can be transmitted, but neither uplink traffic data nor uplink control signaling can be transmitted, in the UpPTS. Table 1 depicts seven uplink-downlink configurations supported in the TDD mode. Common TDD systems include a 3G Time Division Synchronized Code Division Multiple Access (TD-SCDMA) system and a 4G TD-SCDMA LTE system, where uplink and downlink timeslots are allocated statically or semi-statically, and a common practice is to determine and maintain one of the proportions of uplink and downlink timeslots in Table 1 according to a cell type and a rough traffic proportion while a network is being planned.

TABLE 1

Uplink-Downlink configurations

| Uplink-downlink configuration | Downlink-to-Uplink Switch-point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A user-plane latency in the existing LTE FDD/TDD system will be introduced below.

As defined in Section B.2 in the appendix of 3GPP TR36.912, a user-plane (U-plane) latency in the LTE system includes four components of an eNB processing period of time, a frame alignment period of time, a TTI duration, and a UE processing period of time, where the alignment period of time refers to a wait period of time between arrival of traffic, and an air-interface subframe transmission occasion available to the traffic.

Taking LTE-FDD downlink transmission as an example, there is a downlink transmission occasion of each subframe in the FDD system, so the alignment period of time is 0.5 ms on average. The eNB processing period of time is 1 ms in the downlink direction, and 1.5 ms in the uplink direction, and the UE processing period of time is 1 ms in the uplink direction, and 1.5 ms in the downlink direction, so a downlink U-plane latency in the LTE-FDD system is the sum, 4 ms, of the eNB processing period of time, 1 ms, the frame alignment period of time, 0.5 ms, the TTI duration, 1 ms, and the UE processing period of time, 1.5 ms, without retransmitting any Hybrid Automatic Repeat Request (HARQ); and alike an uplink U-plane latency in the LTE-FDD system is also 4 ms without retransmitting any HARQ, as illustrated in FIG. 3.

A U-plane latency in the LTE-TDD system also includes four components of an eNB processing period of time, a frame alignment period of time, a TTI duration, and a UE processing period of time as illustrated in FIG. 4 and FIG. 5, where the eNB processing period of time is 1 ms in the downlink direction, and 1.5 ms in the uplink direction, and the UE processing period of time is 1 ms in the uplink direction, and 1.5 ms in the downlink direction. The TTI duration is the same 1 ms as in the FDD mode, and the frame alignment period of time is related to the time when traffic arrives, and an uplink-downlink configuration for the system. Taking the TDD uplink-downlink configuration 2 as an example, the alignment processing period of time for downlink data is 0.7 m on average, where if a transmitter of the eNB transmits all the data in the subframe #1, then it will not transmit until in the subframe #3, so a frame alignment period of time between transmission and the air-interface subframe will be 1.5 ms on average, and a frame alignment period of time for the other subframes will be 0.5 ms on average, so the downlink U-plane latency in the system configured to apply the TDD uplink-downlink configuration 2 is 4.2 ms as depicted in Table 2 below. Taking the uplink-downlink configuration 5 as an example again, uplink traffic can only be transmitted in the subframe 2, so the UE which has processed all the data to be transmitted in the subframe #2 will not transmit until in the subframe #2 in the next radio frame, the corresponding frame alignment period of time is 9.5 ms, and so on; and the frame alignment period of time for uplink transmission in the TDD uplink-downlink configuration 5 is 5 ms on average, so the uplink U-plane latency is 8.5 ms on average as depicted in Table 3 below. The averages of the downlink and uplink U-plane latencies corresponding to the respective uplink-downlink configurations in the LTE TDD system are as depicted in Table 2 and Table 3, and as can be apparent, both of the U-plane latencies in the TDD system are longer than the U-plane latency 4 ms in the FDD system.

TABLE 2

| | | UL/DL configuration | | | | | | |
|---|---|---|---|---|---|---|---|---|
| Step | Description | 0 | 1 | 2 | 3 | 4 | 5 | 6 |
| 1 | eNB Processing Latency | 1 ms | 1 ms | 1 ms | 1 ms | 1 ms | 1 ms | 1 ms |
| 2 | Frame Alignment | 1.7 ms | 1.1 ms | 0.7 ms | 1.1 ms | 0.8 ms | 0.6 ms | 1.4 ms |
| 3 | TTI duration | 1 ms | 1 ms | 1 ms | 1 ms | 1 ms | 1 ms | 1 ms |
| 4 | UE Processing Latency | 1.5 ms | 1.5 ms | 1.5 ms | 1.5 ms | 1.5 ms | 1.5 ms | 1.5 ms |
| | Total one-way latency | 5.2 ms | 4.6 ms | 4.2 ms | 4.6 ms | 4.3 ms | 4.1 ms | 4.9 ms |

TABLE 3

| | | UL/DL configuration | | | | | | |
|---|---|---|---|---|---|---|---|---|
| Step | Description | 0 | 1 | 2 | 3 | 4 | 5 | 6 |
| 1 | UE Processing Latency | 1 ms | 1 ms | 1 ms | 1 ms | 1 ms | 1 ms | 1 ms |
| 2 | Frame Alignment | 1.1 ms | 1.7 ms | 2.5 ms | 3.3 ms | 4.1 ms | 5 ms | 1.4 ms |
| 3 | TTI duration | 1 ms | 1 ms | 1 ms | 1 ms | 1 ms | 1 ms | 1 ms |
| 4 | eNB Processing Latency | 1.5 ms | 1.5 ms | 1.5 ms | 1.5 ms | 1.5 ms | 1.5 ms | 1.5 ms |
| | Total one-way latency | 4.6 ms | 5.2 ms | 6 ms | 6.8 ms | 7.6 ms | 8.5 ms | 4.9 ms |

A conventional TTI refers to a subframe defined in the LTE system, i.e., a TTI with the length of 1 ms, and a short TTI refers to a TTI with a less transmission length than 1 ms; and as currently ascertained, uplink channels supporting transmission in a short TTI include at least a short Physical Uplink Control Channel (s-PUCCH) and a short Physical Uplink Shared Channel (s-PUSCH), and downlink channels supporting transmission in a short TTI include at least a short Physical Downlink Control Channel (s-PDCCH) and a short Physical Downlink Shared Channel (s-PDSCH).

In summary, although the TD-LTE system operating with the existing frame structure can be well adapted to a varying uplink-downlink traffic proportion as demanded in the network, the user-plane latency performance is not as high as in the FDD system, and the user-plane latency is twice that in the FDD system in some cases. As there is a varying demand for mobile communication traffic, higher user-plane latency performance to be required in a future mobile communication system is defined in the. respective organizations, e.g., the International Telecommunication Union (ITU), etc., so the existing TDD frame structure cannot accommodate similar or comparable user-plane latency performance to the FDD system.

SUMMARY

Embodiments of the invention provide a method and apparatus for notifying a subframe type, and a method and apparatus for determining a subframe type so as to enable a UE to determine a subframe type dynamically to thereby further adapt the subframe type flexibly to a varying demand for traffic transmission, thus improving the transmission efficiency of the system.

An embodiment of the invention provides a method for determining a subframe type, the method including:
  detecting an indicator for determining a subframe type in a preset resource; and
  determining a subframe typo according to a detection result.

With this method, the preset resource is detected for the indicator for determining a subframe type, and a subframe type is determined according to the detection result, so that a UE can determine a subframe type dynamically to thereby further adapt the subframe type flexibly to a varying demand for traffic transmission, thus improving the transmission efficiency of the system.

In an implementation, the detecting an indicator for determining a subframe type in a preset resource includes:
  detecting, in a preset resource, a downlink control channel for scheduling a downlink transmission, or a downlink control channel indicating a downlink Semi-Persistent Scheduling (SPS) resource release; and/or
  detecting a downlink control channel for scheduling uplink transmission in a preset resource.

In an implementation, the determining the subframe type according to the detection result includes:
  when the downlink control channel is detected, determining a subframe type of a subframe in which the downlink control channel is transmitted, or subframe types of N1 subframes starting with the subframe in which the downlink control channel is transmitted, or subframe types of N1 subframes succeeding to the subframe in which the downlink control channel is transmitted, or a subframe type, of a subframe scheduled by the downlink control channel, or subframe types of N2 subframes starting with the subframe scheduled by the downlink control channel according to notification information carried in the downlink control channel, wherein N1 and N2 are positive integers.

In an implementation, the notification information notifies one of a plurality of preconfigured or predefined subframe types, or the notification information notifies one of a plurality of preconfigured or predefined combinations of subframe types, wherein each of the combinations of subframe types comprises particular subframe type of respective ones of a plurality of subframes.

In an implementation, the subframe type includes at least one of a downlink subframe, an uplink subframe, a special subframe, or a preset subframe.

In an implementation, the determining the subframe type according to the detection result includes:

when the downlink control channel for scheduling downlink transmission, or the downlink control channel indicating a downlink SPS resource release is detected, determining a subframe type of a subframe in which the downlink control channel is transmitted as a downlink subframe or a special subframe or a preset subframe, or determining a subframe type of N1 subframes starting with the subframe in which the downlink control channel is transmitted, as a downlink subframe or a special subframe or a preset subframe, or determining a subframe type of N1 subframes succeeding to the subframe in which the downlink control channel is transmitted, as a downlink subframe or a special subframe or a preset subframe, wherein N1 is a positive integer; and/or when the downlink control channel for scheduling uplink transmission is detected, determining a subframe type of a subframe scheduled by the downlink control channel as an uplink subframe or a special subframe or a preset subframe, or determining a subframe type of N2 subframes starting with the subframe scheduled by the downlink control channel as a uplink subframe or a special subframe or a preset subframe, wherein N2 is a positive integer.

In an implementation, the determining the subframe type according to the detection result includes:

when the downlink control channel is not detected in the current subframe, assuming that a subframe type of the current subframe, or a subframe type of N1 subframes starting with the current subframe, or a subframe type of N1 subframes succeeding to the current subframe, or a subframe type of a subframe scheduled by a downlink control channel transmitted in the current subframe, or a subframe type of N2 subframes stating with the subframe scheduled by a downlink control channel transmitted in the current subframe as a predefined or preconfigured subframe type, or as a subframe type determined according to a Time Division Duplex (TDD) uplink-downlink configuration of a UE, or is same as that of a subframe preceding to the current subframe.

In an implementation, the preset resource is each subframe in each radio frame, or a set of subframes notified in configuration signaling.

In an implementation, the detecting the indicator for determining a subframe type in the preset resource includes: receiving common information or UE-specific information in the preset resource.

In an implementation, the determining the subframe type according to the detection result includes:

determining a special subframe or a preset subframe in a preset period according to the common information or the UE-specific information.

In an implementation, a downlink transmission component, an uplink transmission component, and a guard period component included in the special subframe or the preset subframe are predefined, or notified by configuration signaling.

In an implementation, the preset subframe is a subframe including at least uplink transmission resources and downlink transmission resources.

In an implementation, the configuration signaling is carried in a downlink control channel, or is higher-layer signaling or broadcast signaling.

An embodiment of the invention provides a method for notifying a subframe type, the method including:

determining a preset resource for transmitting an indicator, wherein the indicator is applied to indicate a UE to determine a subframe type; and transmitting the indicator over the preset resource.

In an implementation, the transmitting the indicator over the preset resource includes:

transmitting a downlink control channel for scheduling downlink transmission, or a downlink control channel indicating a downlink SPS resource to be released, over the preset resource; and/or transmitting a downlink control channel for scheduling uplink transmission, over the preset resource.

In an implementation, the downlink control channel carries notification information for indicating the UE to determine a subframe type of a subframe in which the downlink control channel is transmitted, or a subframe type of N1 subframes starting with the subframe in which the downlink control channel is transmitted, or a subframe type of N1 subframes succeeding to the subframe in which the downlink control channel is transmitted, or a subframe type of a subframe scheduled by the downlink control channel, or a subframe type of N2 subframes starting with the subframe scheduled by the downlink control channel, wherein N1 and N2 are positive integers.

In an implementation, the notification information notifies one of a plurality of preconfigured or predefined subframe types, or the notification information notifies one of a plurality of preconfigured or predefined combination of subframes, wherein each of the combinations of subframes includes particular subframe type of respective ones of a plurality of subframes.

In an implementation, the subframe type includes at least one of a downlink subframe, an uplink subframe, a special subframe, or a preset subframe.

In an implementation, the transmitting the indicator over the preset resource includes:

transmitting the downlink control channel for scheduling downlink transmission, or the downlink control channel indicating a downlink SPS resource to be released, over the preset resource to instruct the UE to determine a subframe type of a subframe in which the downlink control channel is transmitted, as a downlink subframe or a special subframe or a preset subframe, or determine a subframe type of N1 subframes starting with the subframe in which the downlink control channel is transmitted as a downlink subframe or a special subframe or a preset subframe, or determine a subframe type of N1 subframes succeeding to the subframe in which the downlink control channel is transmitted, as a downlink subframe or a special subframe or a preset subframe, wherein N1 is a positive integer; and/or transmitting the downlink control channel for scheduling uplink transmission, over the preset resource to indicate the UE to determine a subframe type of a subframe scheduled by the downlink control channel as an uplink subframe or a special subframe or a preset subframe, or determine a subframe type of N2 subframes starting with the subframe scheduled by the downlink control channel as a uplink subframe or a special subframe or a preset subframe, wherein N2 is a positive integer.

In an implementation, the preset resource is each subframe in each radio frame, or a set of subframes notified in configuration signaling.

In an implementation, the transmitting the indicator over the preset resource includes: transmitting the indicator in common information or UE-specific information over the preset resource.

In an implementation, the indicator indicates a special subframe or a preset subframe in a preset period.

In an implementation, a downlink transmission component, an uplink transmission component, and a guard period component included in the special subframe or the preset subframe are predefined, or notified in configuration signaling.

In an implementation, the preset subframe is a subframe including at least uplink transmission resources and downlink transmission resources.

In an implementation, the configuration signaling is carried in a downlink control channel, or is higher-layer signaling or broadcast signaling.

An embodiment of the invention provides an apparatus for determining a subframe type, the apparatus including:
a detecting unit configured to detect an indicator for determining a subframe type in a preset resource; and
a determining unit configured to determine a subframe type according to a detection result.

In an implementation, the detecting unit is configured:
to detect in the preset resource, for a downlink control channel for scheduling downlink transmission, or a downlink control channel indicating a downlink SPS resource to be released; and/or
to detect the preset resource for a downlink control channel for scheduling uplink transmission.

In an implementation, the determining unit is configured:
when the downlink control channel is detected, to determine a subframe type of a subframe in which the downlink control channel is transmitted, or a subframe type of N1 subframes starting with the subframe in which the downlink control channel is transmitted, or a subframe type of N1 subframes succeeding to the subframe in which the downlink control channel is transmitted, or a subframe type of a subframe scheduled by the downlink control channel, or a subframe type of N2 subframes starting with the subframe scheduled by the downlink control channel according to notification information carried in the downlink control channel, wherein N1 and N2 are positive integers.

In an implementation, the notification information notifies one of a plurality of preconfigured or prescribed subframe types, or the notification information notifies one of a plurality of preconfigured or prescribed combination of subframe types, wherein each of the combinations of subframe types comprises particular subframe type of respective ones of a plurality of subframes.

In an implementation, the subframe type includes at least one of a downlink subframe, an uplink subframe, a special subframe, or a preset subframe.

In an implementation, the determining unit is configured:
when the downlink control channel for scheduling downlink transmission, or the downlink control channel indicating a downlink SPS resource release is detected, to determine a subframe type of a subframe in which the downlink control channel is transmitted as a downlink subframe or a special subframe or a preset subframe, or determine a subframe type of N1 subframes starting with the subframe in which the downlink control channel is transmitted as a downlink subframe or a special subframe or, a preset subframe, or determine a subframe type of N1 subframes succeeding to the subframe in which the downlink control channel is as a downlink subframe or a special subframe or a preset subframe, wherein N1 is a positive integer; and/or
when the downlink control channel for scheduling uplink transmission is detected, to determine a subframe type of a subframe scheduled by the downlink control channel as an uplink subframe or a special subframe or a preset subframe, or determine a subframe type of N2 subframes starting with the subframe scheduled by the downlink control channel as a uplink subframe or a special subframe or a preset subframe, wherein N2 is a positive integer.

In an implementation, the determining unit is configured:
when the downlink control channel is not detected in the current subframe, to assume that a subframe type of the current subframe, or a subframe type of N1 subframes starting with the current subframe, or a subframe type of N1 subframes succeeding to the current subframe, or a subframe type of a subframe scheduled by a downlink control channel transmitted in the current subframe, or a subframe type of N2 subframes stating with the subframe scheduled by a downlink control channel transmitted in the current subframe as a prescribed or preconfigured subframe type, or a subframe type determined according to a TDD uplink-downlink configuration of the UE, or is same as that of a subframe preceding to the current subframe.

In an implementation, the preset is each subframe in each radio frame, or a set of subframes notified in configuration signaling.

In an implementation, the detecting unit is configured: to receive common information or UE-specific information over the preset resource.

In an implementation, the detecting unit is configured: to determine a special subframe or a preset subframe in a preset period according to the common information or the UE-specific information.

In an implementation, the special subframe or the preset subframe is divided into a downlink transmission component, an uplink transmission component, and a guard period component as predefined, or notified in configuration signaling.

In an implementation, the preset subframe is a subframe including at least uplink transmission resources and downlink transmission resources.

In an implementation, the configuration signaling is carried in a downlink control channel, or is higher-layer signaling or broadcast signaling.

An embodiment of the invention provides an apparatus for notifying a subframe type, the apparatus including:
a determining unit configured to determine a preset resource for transmitting an indicator, wherein the indicator is applied to indicate a UE to determine a subframe type; and a transmitting unit configured to transmit the indicator over the preset resource.

In an implementation, the transmitting unit is configured:

to transmit a downlink control channel for scheduling downlink transmission, or a downlink control channel indicating a downlink SPS resource to be released, over the preset resource; and/or to transmit a downlink control channel for scheduling uplink transmission, over the preset resource.

In an implementation, the downlink control channel carries notification information for indicating the UE to determine a subframe type of a subframe in which the downlink control channel is transmitted, or a subframe type of N1 subframes starting with the subframe in which the downlink control channel is transmitted, or a subframe type of N1 subframes succeeding to the subframe in which the downlink control channel is transmitted, or a subframe type of a subframe scheduled by the downlink control channel, or a subframe type of N2 subframes starting with the subframe scheduled by the downlink control channel, wherein N1 and N2 are positive integers.

In an implementation, the notification information notifies one of a plurality of preconfigured or prescribed subframe types, or the notification information notifies one of a plurality of preconfigured or prescribed combination of subframes, wherein each of the combinations of subframes comprises particular subframe type of respective ones of a plurality of subframes.

In an implementation, the subframe type includes at least one of a downlink subframe, an uplink subframe, a special subframe, and a preset subframe.

In an implementation, the transmitting unit is configured:

to transmit the downlink control channel for scheduling downlink transmission, or the downlink control channel indicating a downlink SPS resource to be released, over the preset resource to indicate the UE to determine a subframe type of a subframe in which the downlink control channel is transmitted, as a downlink subframe or a special subframe or a preset subframe, or determine a subframe type of N1 subframes starting with the subframe in which the downlink control channel is transmitted, as a downlink subframe or a special subframe or a preset subframe, or determine a subframe type of N1 subframes succeeding to the subframe in which the downlink control channel is transmitted, as a downlink subframe or a special subframe or a preset subframe, wherein N1 is a positive integer; and/or to transmit the downlink control channel for scheduling uplink transmission, over the preset resource to indicate the UE to determine a subframe type of a subframe scheduled by the downlink control channel as an uplink subframe or a special subframe or a preset subframe, or determine a subframe type of N2 subframes starting with the subframe scheduled by the downlink control channel as a uplink subframe or a special subframe or a preset subframe, wherein N2 is a positive integer.

In an implementation, the preset resource is each subframe in each radio frame, or a set of subframes notified in configuration signaling.

In an implementation, the transmitting unit is configured: to transmit the indicator in common information or UE-specific information over the preset resource.

In an implementation, the indicator indicates a special subframe or a preset subframe in a preset period.

In an implementation, a downlink transmission component, an uplink transmission component, and a guard period component included in the special subframe or the preset subframe are predefined, or notified in configuration signaling.

In an implementation, the preset subframe is a subframe including at least uplink transmission resources and downlink transmission resources.

In an implementation, the configuration signaling is carried in a downlink control channel, or is higher-layer signaling or broadcast signaling.

BRIEF DESCRIPTION OF THE DRAWINGS

In order to make the technical solutions according to the embodiments of the invention more apparent, the drawings to which reference is to be made in the description of the embodiments will be introduced below in brief, and apparently and the drawings to be described below are only some embodiments of the invention, and those ordinarily skilled in the art can further derive from these drawings other drawings without any inventive effort.

DETAILED DESCRIPTION OF THE EMBODIMENTS

Embodiments of the invention provide a method and apparatus for notifying a subframe type, and a method and apparatus for determining a subframe type so as to enable a UE to determine a subframe type dynamically to thereby further adapt the subframe type flexibly to a varying demand for traffic transmission, thus improving the transmission efficiency of the system.

As there is a varying demand for mobile communication traffic, higher user-plane latency performance to be required in a future mobile communication system is defined in the respective organizations, e.g., the ITU, etc. One of the general ways to shorten a user-plane latency is to reduce the length of a TTI. The technical solutions according to the embodiments of the invention can vary a subframe type of each subframe flexibly, and transmit in the subframe accordingly, so that the user-plane latency can be shorten while the subframe type is still adapted flexibly to traffic.

Figure 1:
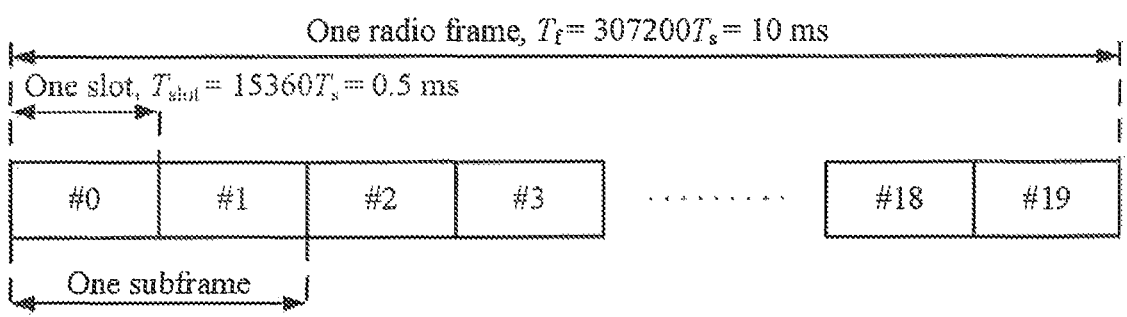
FIG. 1 is a schematic diagram of the frame structure in the LTE FDD system in the related art.
Figure 2:
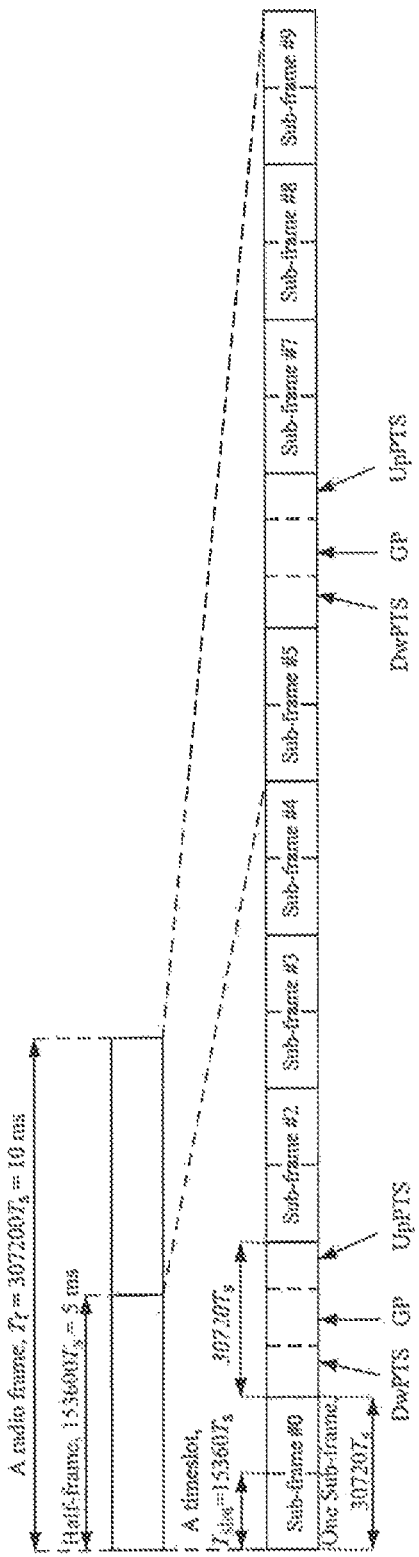
FIG. 2 is a schematic diagram of the frame structure in the LTE TDD system in the related art.
Figure 3:
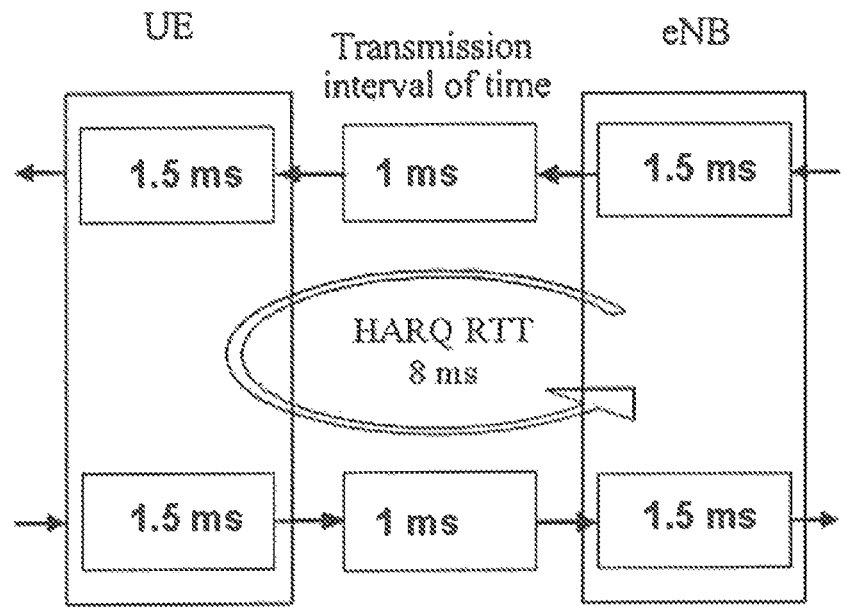
FIG. 3 is a schematic diagram of the components of the user-plane latencies in the FDD system in the related art.
Figure 4:
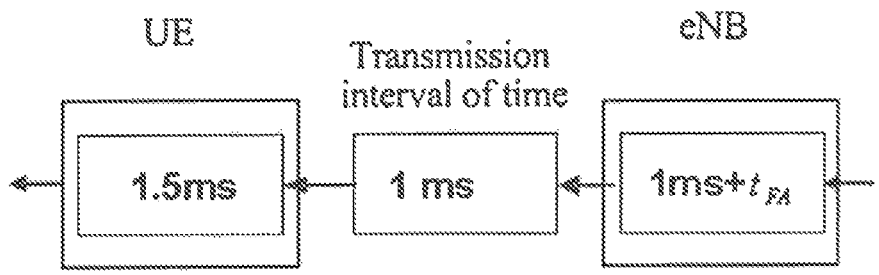
FIG. 4 is a schematic diagram of the components of the downlink user-plane latency in the TDD system in the related art.
Figure 5:
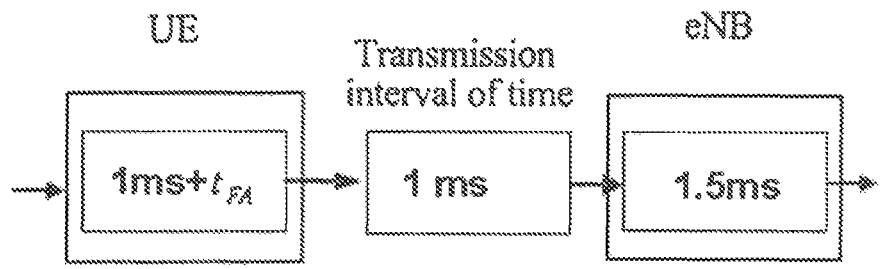
FIG. 5 is a schematic diagram of the components of the uplink user-plane latency in the TDD system in the related art.
Figure 6:
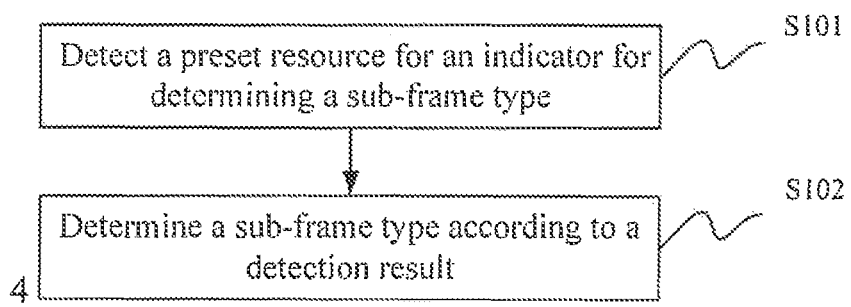
FIG. 6 is a schematic flow chart of a method for determining a subframe type according to an embodiment of the invention.

Referring to FIG. 6, a method for determining a subframe type at the UE side according to an embodiment of the invention includes the following steps.

The step S101 is to detect a preset resource for an indicator for determining a subframe type.

In an implementation, the preset resource is each subframe in each radio frame, or a set of subframes notified in configuration signaling.

The step S102 is to determine a subframe type according to a detection result.

In an implementation, the preset resource is detected for the indicator for determining a subframe type as follows:

the preset resource is detected for a downlink control channel for scheduling downlink transmission, or a downlink control channel indicating a downlink Semi-Persistently Scheduled (SPS) resource to be released; and/or the preset resource is detected for a downlink control channel for scheduling uplink transmission.

For example, the UE determines a subframe type of a subframe corresponding to either of a received downlink (DL) grant and/or uplink (UL) grant, or N subframes starting with the subframe corresponding to the grant, or N subframes succeeding to the subframe corresponding to the grant according to the grant, where the DL grant is carried in a downlink control channel in a Downlink Control Information (DCI) format corresponding to downlink transmission, and the UL grant is carried in a downlink control channel in a DCI format corresponding to uplink transmission.

Accordingly in an implementation, the subframe type is determined according to the detection result as follows:

when the downlink control channel is detected, a subframe type of a subframe in which the downlink control channel is transmitted, or subframe types of N1 subframes starting with the subframe in which the downlink control channel is transmitted, or subframe types of N1 subframes succeeding to the subframe in which the downlink control channel is transmitted, or a subframe type of a subframe scheduled by the downlink control channel, or subframe types of N2 subframes starting with the subframe scheduled by the downlink control channel is determined according to notification information carried in the downlink control channel, where N1 and N2 are positive integers.

In an implementation, the notification information notifies one of a plurality of preconfigured or predefined subframe types, or the notification information notifies one of a plurality of preconfigured or predefined combination of subframes, where each combination of subframes includes particular subframe types of respective ones of a plurality of subframes. For example, the subframe type of each of the N1 subframes or the N2 subframes above can be represented in a bitmap, or enumerated.

In an implementation, the subframe type(s) include(s) one or more of a downlink subframe, an uplink subframe, a special subframe, and a preset subframe.

In an implementation, the special subframe or the preset subframe includes a downlink transmission component, an uplink transmission component, and a guard period component which are predefined, or notified via configuration signaling.

In an implementation, the preset subframe is a subframe including at least uplink transmission resources and downlink transmission resources, that is, a part of symbols in the subframe are defined for downlink transmission, and a part of the symbols are defined for uplink transmission; and of course, the preset subframe further includes a guard period between uplink and downlink transmission resources (that is, a part of symbols between the uplink and downlink transmission resources are reserved, and no information is transmitted in the part of the symbols, and the preset subframe can also be referred to as a self-contained subframe or a new subframe type or a new special subframe or the like). Unlike the special subframe defined in the existing TDD system, uplink data, e.g., an uplink shared channel, an uplink control channel, etc., can be transmitted over an uplink transmission resource in the preset subframe as referred to in the embodiment of the invention; and of course, if uplink transmission data can be allowed to be transmitted over an uplink transmission resource in the special subframe defined in the existing TDD system, then the special subframe and the preset subframe may not be distinguished from each other, but may be referred collectively to as a special subframe or a preset subframe, and this will also apply hereinafter.

In an implementation, the configuration signaling is carried in a downlink control channel, or is higher-layer signaling or broadcast signaling, where the downlink control channel includes a conventional downlink control channel or short downlink control channel, and can be a downlink control channel based upon a Physical Downlink Control Channel (PDCCH) or an Enhanced Physical Downlink Control Channel (EPDCCH).

Alternatively in an implementation, the detecting the preset resource for the indicator for determining a subframe type includes: receiving common information or UE-specific information over the preset resource.

In an implementation, the subframe type(s) is or are determined according to the detection result as follows.

Special subframes or preset subframes in a preset period are determined according to the common information or the UE-specific information.

Stated otherwise, in the embodiment of the invention, it can be further notified via the common information or the UE-specific information which subframes in a period are special subframes or preset subframes (data are transmitted in the other subframes according to subframe types determined in a TDD uplink-downlink configuration) This is simple in that the notified subframes are special subframes or preset subframes, and the subframe types of the other subframes are determined according to the TDD uplink-downlink configuration (the TDD uplink-downlink configuration here can be configured in system information, or a reference TDD uplink-downlink configuration); or course, the subframe frame of each subframe in a preset period can be notified via the common information or the UE-specific information.

Five implementations in which a subframe(s) is determined at the UE side will be described below.

In a first implementation, the UE detects each subframe in a preset set of subframes for a DL grant (the DL grant further includes a downlink control channel indicating a downlink SPS resource to be released, and this will also apply hereinafter), and when the DL grant of the UE is detected, the UE determines a subframe type for the UE in a transmission subframe of the DL grant, or subframe types of N1 subframes starting with the transmission subframe of the DL grant, or subframe types of N2 subframes succeeding the transmission subframe of the DL grant according to notification information carried in the DL grant, where N1 is a positive integer greater than or equal to 1;

where the subframe type(s) include(s) one of a downlink subframe, an uplink subframe, a special subframe, and a preset subframe, or a combination thereof, or the subframe(s) include(s) one of a downlink subframe, a special subframe, and a preset subframe, or a combination thereof;

The notification information notifies a subframe type, e.g., one of a downlink subframe, an uplink subframe, a special subframe, and a preset subframe, or one of a downlink subframe, a special subframe, and a preset subframe, and at this time, the subframe type of the subframe, or each subframe in the set of subframes, corresponding to the DL grant is the subframe type indicated in the notification information. For example, if the notification information notifies that the subframe type is a downlink subframe, then it will be determined that the subframe type of the transmission subframe of the DL grant is a downlink subframe, or all of the subframe types of the N1 subframes starting with the transmission subframe of the DL grant, or the N1 subframes succeeding to the transmission subframe of the DL grant are downlink subframes. In another example, if the notification information notifies that the subframe type is a preset subframe, then it will be determined that the subframe type of the transmission subframe of the DL grant is a preset subframe, or all of the subframe types of the N1 subframes starting with the transmission subframe of the DL grant, or the N1 subframes succeeding to the transmission subframe of the DL grant are preset subframes. Alternatively the notification information notifies one of K combinations of subframe types which are preconfigured or predefined in higher-layering signaling, where each combination of subframe types includes the particular subframe type of each of the N1 subframes. For example, the higher-layering signaling pre-configures or prescribes two combinations of subframe types, and for example, N1=2, where the first combination of subframe types is {downlink subframe, downlink subframe}, and the second combination of subframe types is {downlink subframe, preset subframe}, then the notification information may be 1-bit information; and when the state of the notification information is "0", it indicates the first combination of subframe types, so the subframe types of the N1 subframes starting with the transmission subframe of the DL grant, or the N1 subframes succeeding to the transmission subframe of the DL grant are {downlink subframe, downlink subframe} in that order, and when the state of the notification information is "1", it indicates the second combination of subframe types, so the subframe types of the N1 subframes starting with the transmission subframe of the DL grant, or the N1 subframes succeeding to the transmission subframe of the DL grant are {downlink subframe, preset subframe} in that order.

If no DL grant of the UE is detected, then the UE will assume that the subframe type of the transmission subframe of the DL grant, or the subframe types of the N1 subframes starting with the transmission subframe of the DL grant, or the subframe types of the N1 subframes succeeding to the transmission subframe of the DL grant is or are the same as that of a subframe preceding to the transmission subframe of the DL grant, or a predetermined subframe type(s) (e.g., a downlink subframe(s) or an uplink subframe(s) or a special subframe(s) or a preset subframe(s)), or a subframe type(s) determined according to a TDD uplink-downlink configuration of the UE over the current carrier (the TDD uplink-downlink configuration is configured in system information, or a reference TDD uplink-downlink configuration);

where the DL grant is transmitted in a conventional LTE control region (i.e., in first K symbols in a subframe, where a PDCCH or a sPDCCH can be transmitted), or in a short TTI search space.

In a second implementation, the UE detects each subframe in a preset set of subframes for a UL grant, and when the UL grant of the UE is detected, the UE determines a subframe type of a subframe corresponding to the UL grant of the UE (i.e., a subframe in which data scheduled by the UL grant are transmitted), or subframe types of N2 subframes starting with the corresponding subframe according to notification information carried in the UL grant;

where the subframe type(s) include(s) one of a downlink subframe, an uplink subframe, a special subframe, and a preset subframe, or a combination thereof, or the subframe(s) include(s) one of a downlink subframe, a special subframe, and a preset subframe, or a combination thereof;

The notification information notifies one of a downlink subframe, an uplink subframe, a special subframe, and a preset subframe, or one of a downlink subframe, a special subframe, and a preset subframe, and at this time, the subframe type of the subframe, or each subframe in the set of subframes, corresponding to the UL grant is the subframe type indicated in the notification information. For example, if the notification information notifies that the subframe type is an uplink subframe, then it will be determined that the subframe type of the subframe corresponding to the UL grant is an uplink subframe, or all of the subframe types of the N2 subframes starting with the subframe corresponding to the UL grant are uplink subframes. In another example, if the notification information notifies that the subframe type is a preset subframe, then it will be determined that the subframe type of the subframe corresponding to the UL grant is a preset subframe, or all of the subframe types of the N2 subframes starting with the subframe corresponding to the UL grant are preset subframes. Alternatively the notification information notifies one of K combinations of subframe types which are preconfigured or predefined in higher-layering signaling, where each combination of subframe types includes the particular subframe type of each of the, N2 subframes, For example, the higher-layering signaling pre-configures or prescribes two combinations of subframe types, and for example, N2=2, where the first combination of subframe types is {uplink subframe, uplink subframe}, and the second combination of subframe types is {uplink subframe, preset subframe}, then the notification information may be 1-bit information; and when the state of the notification information is "0", it indicates the first combination of subframe types, so the subframe types of the N2 subframes starting with the subframe corresponding to the UL grant are {uplink subframe, uplink subframe} in that order, and when the state of the notification information is "1", it indicates the second combination of subframe types, so the subframe types of the N2 subframes starting with the subframe corresponding to the UL grant are {uplink subframe, preset subframe} in that order.

If no DL grant of the UE is detected, then the UE will assume that the subframe type of the subframe corresponding to the UC grant, or the subframe types of the N2 subframes starting with the corresponding subframe is or are the same as that of a subframe preceding to the subframe corresponding to the UL grant, or the subframe type of the subframe corresponding to the UL grant, or the subframe types of the N2 subframes starting with the corresponding to subframe is or are a predetermined subframe type(s) (e.g., a downlink subframe(s) or an uplink subframe(s) or a special subframe(s) or a preset subframe(s)), or the subframe type of the subframe corresponding to the UL grant, or the subframe types of the N2 subframes starting with the corresponding to subframe is or are a subframe type(s) determined according to a TDD uplink-downlink configuration of the UE over the current carrier (the TDD uplink-downlink configuration is configured in system information, or a reference TDD uplink-downlink configuration).

The UL grant is transmitted in a conventional LTE control region (i.e., in first K symbols in a subframe, where a PDCCH or a sPDCCH can be transmitted), or in a short TTI search space.

In a third implementation, the UE detects each subframe in a preset set of subframes for a DL grant, and when the DL grant of the UE is detected, the UE determines a subframe type for the UE in a transmission subframe of the DL grant, or subframe types of N1 subframes starting with the transmission subframe of the DL grant, or subframe types of N2 subframes succeeding the transmission subframe of the DL grant according to notification information carried in the DL grant as a downlink subframe(s); or the UE detects each subframe in a preset set of subframes for a DL grant, and when the DL grant of the UE is detected, the UE determines a subframe type for the UE in a transmission subframe of the DL grant, or subframe types of N1 subframes starting with the transmission subframe of the DL grant, or subframe types of N2 subframes succeeding the transmission subframe of the DL grant according to notification information carried in the DL grant as a special subframe(s) or a preset subframe(s), where N1 is a positive integer greater than or equal to 1;

If no DL grant of the UE is detected, then the UE will assume that the subframe type of the transmission subframe of the DL grant, or the subframe types of the N1 subframes starting with the transmission subframe of the DL grant, or the subframe types of the N1 subframes succeeding to the transmission subframe of the DL grant is or are the same as that of a subframe preceding thereto, or the subframe type of the transmission subframe of the DL grant, or the subframe types of the N1 subframes starting with the transmission subframe of the DL grant, or the subframe types of the N1 subframes succeeding to the transmission subframe of the DL grant is or are a predetermined subframe type(s) (e.g., a downlink subframe(s) or an uplink subframe(s) or a special subframe(s) or a preset subframe(s)), or a subframe type(s) determined according to a TDD uplink-downlink configuration of the UE over the current carrier (the TDD uplink-downlink configuration is configured in system information, or a reference TDD uplink-downlink configuration);

where the DL grant is transmitted in a conventional LTE control region (i.e., in first K symbols in a subframe, where a PDCCH or a sPDCCH can be transmitted), or in a short TTI search space.

In a fourth implementation, the UE detects each subframe in a preset set of subframes for a UL grant, and when the UL grant of the UE is detected, the UE determines a subframe type of a subframe corresponding to the UL grant (i.e., a subframe in which data scheduled by the UL grant are transmitted), or subframe types of N2 subframes starting with the corresponding subframe as an uplink subframe(s); or the UE detects each subframe in a preset set of subframes for a UL grant, and when the UL grant of the UE is detected, the UE determines a subframe type of a sub frame corresponding to the UL grant, or subframe types of N2 subframes starting with the corresponding subframe as a special subframe(s) or a preset subframe(s), where N2 is a positive integer greater than or equal to 1; and If no UL grant of the UE is detected, then the UE will assume that the subframe type of the subframe corresponding to the UL grant, or the subframe types of the N2 subframes starting with the corresponding subframe is or are a predetermined subframe type(s) (e.g., a downlink subframe(s) or an uplink subframe(s) or a special subframe(s) or a preset subframe(s)), or the subframe type of the subframe corresponding to the UL grant, or the subframe types of the N2 subframes starting with the corresponding subframe is or are a subframe type(s) determined according to a TDD uplink-downlink configuration of the UE over the current carrier (the TDD uplink-downlink configuration is configured in system information, or a reference TDD uplink-downlink configuration);

where the UL grant is transmitted in a conventional LTE control region (i.e., in first K symbols in a subframe, where a PDCCH or a sPDCCH can be transmitted), or in a short TTI search space.

In the first, second, third, and fourth implementations above, the preset of subframes is predefined as respective subframes in a radio frame (which include uplink subframes determined according to a TDD uplink-downlink configuration), or the preset of subframes is a set of subframes notified in configuration signaling.

Here the configuration signaling can be transmitted in a conventional control region in the LTE system (e.g., carried in a DL grant or a UL grant transmitted in first K symbols in a subframe, where the DL grant or the UL grant can be UE specific, or shared by UEs); or the configuration signaling is higher-layer signaling or broadcast signaling.

As can be apparent from the several implementations above, in the embodiment of the invention, in an implementation, the subframe type(s) is or are determined according to the detection result as follows:

when the downlink control channel is detected, a subframe type of a subframe in which the downlink control channel is transmitted, or subframe types of N1 subframes starting with the subframe in which the downlink control channel is transmitted, or subframe types of N1 subframes succeeding to the subframe in which the downlink control channel is transmitted, or a subframe type of a subframe scheduled by the downlink control channel, or subframe types of N2 subframes starting with the subframe scheduled by the downlink control channel is or are determined according to notification information carried in the downlink control channel, where N1 and N2 are positive integers.

In an implementation, the notification information notifies one of a plurality of preconfigured or predefined subframe types, or the notification information notifies one of a plurality of preconfigured or predefined combination of subframes, where each combination of subframes includes particular subframe types of respective ones of a plurality of subframes. For example, the subframe type of each of the N1 subframes or the N2 subframes above can be represented in a bitmap, or enumerated.

Alternatively in an implementation, the subframe type(s) is or are determined according to the detection result as follows:

when the downlink control channel for scheduling downlink transmission, or the downlink control channel indicating a downlink SPS resource to be released is detected, a subframe type of a subframe in which the downlink control channel is transmitted is determined as a downlink subframe or a special subframe or a preset subframe, or subframe types of N1 subframes starting with the subframe in which the downlink control channel is transmitted are determined as downlink subframes or special subframes or preset subframes, or subframe types of N1 subframes succeeding to the subframe in which the downlink control channel is transmitted are determined as downlink subframes or special subframes or preset subframes, where N1 is a positive integer; and/or when the downlink control channel for scheduling uplink transmission is detected, a subframe type of a subframe scheduled by the downlink control channel is determined as an uplink subframe or a special subframe or a preset subframe, or subframe types of N2 subframes starting with the subframe scheduled by the downlink control channel are determined as uplink subframes or special subframes or preset subframes, where N2 is a positive integer.

In an implementation, the subframe type(s) is or are determined according to the detection result as follows:

when the downlink control channel is not detected in the current subframe, it is assumed that a subframe type of the current subframe, or subframe types of N1 subframes starting with the current subframe, or subframe types of N1 subframes succeeding to the current subframe, or a subframe type of a subframe scheduled by a downlink control channel transmitted in the current subframe, or subframe types of N2 subframes stating with the subframe scheduled by the downlink control channel transmitted in the current subframe is or are the same as that of a subframe preceding to the current subframe, or a predefined or preconfigured subframe type(s), or a subframe type(s) determined according to a TDD uplink-downlink configuration of the UE.

In a fifth implementation, it is determined according to common information or UE-specific information which subframes in a period are special subframes or preset subframes.

Here the common information or the UE-specific information can be transmitted over a predetermined time-frequency resource, e.g., in a conventional LTE control region (i.e., first K symbols in a subframe), or over a specific resource in a predetermined subframe.

When it is determined according to the UE-specific information which subframes in a period are special subframes or preset subframes, the UE-specific information can alternatively be transmitted in a UE-specific search space over a conventional PDCCH or sPDCCH.

The common information or the UE-specific information above can be transmitted in each subframe, or in a part of the subframes at a specific period.

In the first, second, third, fourth, and fifth implementations above, a part of symbols in the special subframe are used for downlink transmission, a part of the symbols are used for uplink transmission, and a part of the symbols are used as a guard period in the subframe.

In the first, second, third, fourth, and fifth implementations above, the special subframe or the preset subframe is divided into a downlink transmission component, an uplink transmission component, and a guard period component as predefined, or notified in configuration signaling.

In an implementation, when the special subframe or the preset subframe is divided into a downlink transmission component, an uplink transmission component, and a guard period component as notified in configuration signaling, the special subframe or the preset subframe can be divided into a downlink transmission component, an uplink transmission component, and a guard period component as notified in the DL grant or the UL grant, or in higher-laying signaling, or in broadcast signaling.

In an implementation, the configuration signaling notifies one of a plurality of predefined division schemes of a downlink transmission component, an uplink transmission component, and a guard period component directly, and for example, the first to sixth symbols are downlink transmission, the seventh and eighth symbol are a guard period, and the ninth to fourteenth symbols are uplink transmission in a first predefined division scheme, the first to ninth symbols are downlink transmission, the tenth symbol is a guard period, and the eleventh to fourteenth symbols are uplink transmission in a second predefined division scheme, and the first to fourth symbols are downlink transmission, the fifth and sixth symbols are a guard period, and the seventh to fourteenth symbols are uplink transmission in a third division scheme, so the configuration signaling can notify one of them as a particular resource division pattern of a special subframe or a preset subframe; or the configuration signaling notifies an division scheme of a downlink transmission component, an uplink transmission component, and a guard period component in a special subframe directly, and for example, can notify directly the number and positions of symbols in the downlink component, the number and positions of symbols in the uplink component, and the guard period including the remaining symbols.

A solution at the eNB side will be similar to that as described above.

Figure 7:
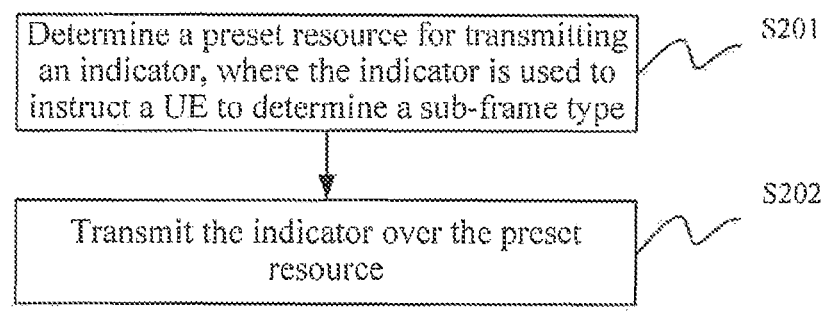
FIG. 7 is a schematic flow chart of a method for notifying a subframe type according to an embodiment of the invention.

Referring to FIG. 7, a method for notifying a subframe type at the eNB side according to an embodiment of the invention includes the following steps.

The step S201 is to determine a preset resource for transmitting an indicator, where the indicator is used to indicate a UE to determine a subframe type.

The step S202 is to transmit the indicator over the preset resource.

In an implementation, the indicator is transmitted over the preset resource as follows:

a downlink control channel for scheduling downlink transmission, or a downlink control channel indicating a downlink SPS resource to be released is transmitted over the preset resource; and/or a downlink control channel for scheduling uplink transmission is transmitted over the preset resource.

In an implementation, the downlink control channel carries notification information to indicate the UE to determine a subframe type of a subframe in which the downlink control channel is transmitted, or subframe types of N1 subframes starting with the subframe in which the downlink control channel is transmitted; or subframe types of N1 subframes succeeding to the subframe in which the downlink control channel is transmitted, or a subframe type of a subframe scheduled by the downlink control channel, or subframe types of N2 subframes starting with the subframe scheduled by the downlink control channel, where N1 and N2 are positive integers.

In an implementation, the notification information notifies one of a plurality of preconfigured or predefined subframe types, or the notification information notifies one of a plurality of preconfigured or predefined combination of subframes, where each combination of subframes includes particular subframe types of respective ones of a plurality of subframes.

In an implementation, the subframe type(s) include(s) one or more of a downlink subframe, an uplink subframe, a special subframe, and a preset subframe.

In an implementation, the indicator is transmitted over the preset resource as follows:

the downlink control channel for scheduling downlink transmission, or the downlink control channel indicating a downlink SPS resource to be released is transmitted over the preset resource to indicate the UE to determine a subframe type of a subframe in which the downlink control channel is transmitted as a downlink subframe or a special subframe or a preset subframe, or subframe types of N1 subframes starting with the subframe in which the downlink control channel is transmitted as downlink subframes or special subframes or preset subframes, or subframe types of N1 subframes succeeding to the subframe in which the downlink control channel is transmitted as downlink subframes or special subframes or preset subframes, where N1 is a positive integer; and/or the downlink control channel for scheduling uplink transmission is transmitted over the preset resource to indicate the UE to determine a subframe type of a subframe scheduled by the downlink control channel as an uplink subframe or a special subframe or a preset subframe, or subframe types of N2 subframes starting with the subframe scheduled by the downlink control channel as uplink subframes or special subframes or preset subframes, where N2 is a positive integer.

In an implementation, the preset resource is each subframe in each radio frame, or a set of subframes notified in configuration signaling.

In an implementation, the transmitting the indicator over the preset resource includes: transmitting the indicator in common information or UE-specific information over the preset resource, where the indicator indicates a special subframe or a preset subframe in a preset period.

In an implementation, the special subframe or the preset subframe is divided into a downlink transmission component, an uplink transmission component, and a guard period component as predefined, or notified in configuration signaling.

In an implementation, the preset subframe is a subframe including at least uplink transmission resources and downlink transmission resources.

In an implementation, the configuration signaling is carried in a downlink control channel, or is higher-layer signaling or broadcast signaling.

Several particular embodiments will be described below by way of an example.

In a first embodiment (corresponding to the first implementation above), the TDD uplink-downlink configuration of the UE is the configuration 1 in Table 1, the UE determines by default that each subframe in a radio frame is to be detected for a DL grant, and for example, a DL grant is detected in the subframe 2, and a subframe type indicated in an indicator field in the DL grant is a downlink subframe, so the UE transmits in the subframe 2 as in a downlink subframe (although this subframe is an uplink subframe in the existing TDD uplink-downlink configuration), so that the uplink subframe 2 is changed dynamically to a downlink subframe; otherwise (that is, if no DL grant is detected), then the subframe 2 may be determined as an uplink subframe according to the TDD uplink-downlink configuration in Table 1, for example; or the indicator field in the DL grant indicates a preconfigured or predefined combination of subframe types of N1 subframes, and for example, ten subframes are defined as a unit, and subframe types of ten subframes are predefined or preconfigured as depicted in Table 4 below (where S can represent a special subframe. Or a preset subframe), so if the indicator field in the DL grant indicates "01", then subframe types of NI subframes starting with the subframe 2, or subframe types of N2 subframes succeeding to the subframe 2 are determined according to the second combination of subframe types in Table 4; or the DL grant can further indicate subframe types of N1 subframes starting with the subframe 2, or subframe types of N2 subframes succeeding to the subframe 2, where the N2 subframes succeeding to the subframe 2 may be subframes consecutive to the subframe 2, or may be subframes inconsecutive to the subframe 2, e.g., N1 subframes in the next radio frame.

TABLE 4

A correspondence relationship between the indicator field in the DL grant, and a combination of subframe types of N1 subframes

| The indicator field in the DL grant | An order of N1 subframes | | | | | | | | | |
|---|---|---|---|---|---|---|---|---|---|---|
| | 1 | 2 | 3 | 4 | 5 | 6 | 7 | 8 | 9 | 10 |
| 00 | D | D | S | U | D | D | D | D | D | D |
| 01 | D | D | S | U | U | D | D | D | D | D |
| 10 | D | D | S | U | U | U | D | D | S | U |
| 11 | D | D | D | S | D | D | D | D | S | U |

In a second embodiment (corresponding to the second implementation above), the TDD uplink-downlink configuration of the UE is the configuration 1 in Table 1, the UE determines by default that each subframe in a radio frame is to be detected for a UL grant, and for example, a UL grant is detected in the subframe 5, and the UL grant schedules uplink transmission in the subframe 9, so the UE transmits in the subframe 9 as in an uplink subframe (although this subframe is a downlink subframe in the existing TDD uplink-downlink configuration), so that the downlink subframe is changed dynamically to a subframe including uplink resources; otherwise (that is, if no UL grant is detected), then the subframe 9 may be determined as a downlink subframe according to the TDD uplink-downlink configuration in Table 1, for example; or the indicator field in the UL grant indicates a preconfigured or predefined combination of subframe types of N2 subframes, and for example, ten subframes are defined as a unit, and subframe types of ten subframes are predefined or preconfigured as depicted in Table 5 below (where S can represent a special subframe or a preset subframe), so if the indicator field in the UL grant indicates "01", then subframe types of N2 subframes starting with the subframe 9, or subframe types of N2 subframes succeeding to the subframe 9 are determined according to the second combination of subframe types in Table 5; or the UL grant can further indicate subframe types of N1 subframes starting with the subframe 9, or subframe types of N2 subframes succeeding to the subframe 9, where the N2 subframes succeeding to the subframe 9 may be subframes consecutive to the subframe 9, or may be subframes inconsecutive to the subframe 9, e.g., N2 subframes in the next radio frame.

TABLE 5

A correspondence relationship between the indicator field in the UL grant, and a combination of subframe types of N2 subframes

| The indicator field in the UL grant | An order of N2 subframes | | | | | | | | | |
|---|---|---|---|---|---|---|---|---|---|---|
| | 1 | 2 | 3 | 4 | 5 | 6 | 7 | 8 | 9 | 10 |
| 00 | U | D | D | D | S | U | D | D | D | U |
| 01 | U | D | D | D | S | U | D | D | D | S |

TABLE 5-continued

A correspondence relationship between the indicator field in the
UL grant, and a combination of subframe types of N2 subframes

| The indicator field in the UL grant | An order of N2 subframes | | | | | | | | | |
|---|---|---|---|---|---|---|---|---|---|---|
| | 1 | 2 | 3 | 4 | 5 | 6 | 7 | 8 | 9 | 10 |
| 10 | S | D | D | D | D | S | U | D | D | D |
| 11 | S | D | D | D | D | S | U | D | S | U |

In a third embodiment (corresponding to the third implementation above), the TDD uplink-downlink configuration of the UE is the configuration 1 in Table 1, the UE determines by default that each subframe in a radio frame is to be detected for a DL grant, and for example, a DL grant is detected in the subframe 2, so the UE transmits in the subframe 2 as in a downlink subframe or a special subframe or a preset subframe (although this subframe is an uplink subframe in the existing TDD uplink-downlink configuration), so that the uplink subframe 2 is changed dynamically to a subframe including downlink resources; otherwise (that is, if no DL grant is detected), then the subframe 2 may be determined as an uplink subframe according to the TDD uplink-downlink configuration in Table 1, or the subframe 2 may be determined as an uplink subframe as predefined, for example. If the UE determines the subframe 2 as a special subframe or a preset subframe, then for example, the UE may transmit in a predefined special or preset subframe pattern, and for example, with a normal Cyclic Prefix (CP), the first to sixth symbols are predefined as downlink transmission, two middle symbols are predefined as a Guard Period (GP), and the last six symbols are predefined as uplink transmission, or the DL grant further carries an indicator indicating a division scheme of downlink (DL), GP, and uplink (UP) components in a special subframe or a preset subframe, and for example, the indicator indicates only the particular numbers of symbols in two components, and the number of symbols in the remaining component can be derived, or the indicator indicates the numbers of symbols in the respective components.

In a fourth embodiment (corresponding to the fourth implementation above), the TDD uplink-downlink configuration of the UE is the configuration 1 in Table 1, the UE determines by default that each subframe in a radio frame is to be detected for a UL grant, and for example, a UL grant is detected in the subframe 5, and the UL grant schedules uplink transmission in the subframe 9, so the UE determines the subframe 9 as an uplink subframe, or the UE determines the subframe 9 as a special subframe or a preset subframe; otherwise (that is, if no UL grant is detected), then the subframe 9 may be determined as a downlink subframe according to the TDD uplink-downlink configuration, or the subframe 9 may be determined as a downlink subframe, for example. If the UE determines the subframe 9 as a special subframe or a preset subframe, then for example, the UE may transmit in a predefined special or preset subframe pattern, and for example, with a normal CP, the first to sixth symbols are predefined as downlink transmission, two middle symbols are predefined as a Guard Period (GP), and the last six symbols are predefined as uplink transmission, or the UL grant further carries an indicator indicating a division scheme of downlink (DL), GP, and uplink (UP) components in a special subframe or a preset subframe, and for example, the indicator indicates only the particular numbers of symbols in two components, and the number of symbols in the remaining component can be derived, or the indicator indicates the numbers of symbols in the respective components.

In the embodiment above, alternatively a set of subframes can be preconfigured, and subframes in the set of subframes can be detected for a DL grant or a UL grant; and for example, for the TDD uplink-downlink configuration 1, a set of subframes {#1, 3, 4, 6, 8, 9} is predefined or preconfigured, and these subframes can be detected for a DL grant indicating a subframe type, so that subframe types of these subframes can be changed, and subframe types of the other subframes cannot be changed, but defaulted as subframe types defined in the TDD uplink-downlink configuration, or as downlink subframes; and for a UL grant to be detected, alike a set of subframes to be detected for a UL grant can be predefined or preconfigured, subframe types of scheduled subframes corresponding to subframes in the set of subframes can be changed, and subframes types of the other subframes cannot be changed, but defaulted as subframe types defined in the TDD uplink-downlink configuration, or as downlink subframes.

The set of subframes above may be fixed, for example, predefined, or may be semi-static, for example, notified in higher-layer signaling, or may be changed periodically, for example, broadcasted and notified, or notified in DCI, and changed periodically according to the broadcast channel or the DCI, transmitted at a specific period. If the set of subframes above is notified in the DCI, then the DCI may be transmitted in a conventional control region in the LTE system, so the UE firstly detects, the conventional control region in the first downlink subframe, for the DCI, and then determines those subframes to be detected for a DL/UL grant, according to an indicator in the DCI, or the DCI may be transmitted in a short TTI search space, so the UE can determine those subframes to be detected for a DL/UL grant, according to an indicator in a first piece of short TTI scheduling information upon reception of the first piece of short TTI scheduling information, where the DCI can be shared by a part or all of UEs, or can be UE-specific; and if the set of subframes above is broadcasted and notified, then the UE will firstly obtain broadcast information according to configuration information including a broadcast period, etc., and then further determine those subframes to be detected for a DL/UL grant.

It shall be noted that in the embodiment above, if a subframe for which subframe types are determined according to a grant 1 overlaps with a subframe for which subframe types are determined according to a grant 2, then an indicator of a grant received earlier for the overlapping subframe will be overwritten with an indicator of a grant receiver later for the overlapping subframe, that is, a subframe type of the same subframe is determined as a subframe type indicated in a lastly received grant for indicating the subframe type thereof.

In a fifth embodiment (corresponding to the fifth implementation), the UE receives broadcast notification or DCI at a specific period, and the broadcast channel or the DCI indicates subframe types in a period, and for example, indicates which subframes in a radio frame in which the broadcast channel or the DCI is transmitted, or a radio frame succeeding thereto are special subframes or preset subframes, where a set of P special subframes or preset subframes can be predefined or preconfigured, and for example, special subframes or preset subframes in a set 1 are the subframes 1 and 3 in a radio frame, special subframes or preset subframes in a set 2 are the subframes 1, 3, 6 and 8 in a radio frame, special subframes or preset subframes in a set 3 are the subframes 1, 3, and 4 in a radio frame, and special subframes or preset subframes in a set 4 are the subframes 1, 3, 4, 6, 8, and 9 in a radio frame, so the broadcast channel or the DCI indicates one of the sets to the UE, or can indicate types of respective subframes in a radio frame in a bitmap, or indicate subframe numbers of the special subframes or the preset subframes directly, or can further indicate an uplink-downlink allocation scheme of the special subframes or the preset subframes, or an uplink-downlink allocation scheme of the special subframes or the preset subframes can be defaulted. If the set of subframes is notified in the DCI, then the DCI may be transmitted in a conventional control region in the LTE system, so the UE firstly detects, the conventional control region in the first downlink subframe, for the DCI, and then determines which subframes are special subframes or preset subframes according to an indicator in the DCI, or the DCI may be transmitted in a short TTI search space, so the UE can determine which subframes are special subframes or preset subframes according to an indicator in a first piece of short TTI scheduling information upon reception of the first piece of short TTI scheduling information, where the DCI can be shared by a part or all of UEs, or can be UE-specific; and if the set of subframes is broadcasted and notified, then the UE will firstly obtain broadcast information according to configuration information including a broadcast period, etc., and then further determine which subframes are special subframes or preset subframes.

Figure 8:
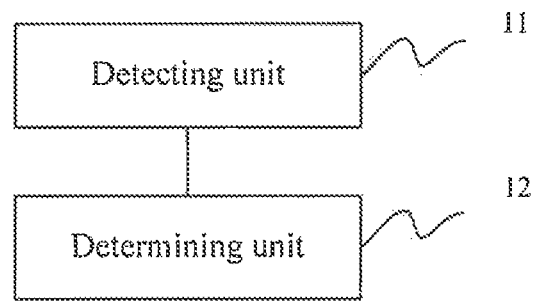
FIG. 8 is a schematic structural diagram of an apparatus for determining a subframe type according to an embodiment of the invention.

Referring to FIG. 8, an apparatus for determining a subframe type at the UE side according to an embodiment of the invention includes:

a detecting unit 11 is configured to detect a preset resource for an indicator for determining a subframe type; and a determining unit 12 is configured to determine a subframe type according to a detection result.

In an implementation, the detecting unit is configured:

to detect the preset resource for a downlink control channel for scheduling downlink transmission, or a downlink control channel indicating a downlink SPS resource to be released; and/or to detect the preset resource for a downlink control channel for scheduling uplink transmission.

In an implementation, the determining unit is configured:

when the downlink control channel is detected, to determine a subframe type of a subframe in which the downlink control channel is transmitted, or subframe types of N1 subframes starting with the subframe in which the downlink control channel is transmitted, or subframe types of N1 subframes succeeding to the subframe in which the downlink control channel is transmitted, or a subframe type of a subframe scheduled by the downlink control channel, or subframe types of N2 subframes starting with the subframe scheduled by the downlink control channel according to notification information carried in the downlink control channel, where N1 and N2 are positive integers.

In an implementation, the notification information notifies one of a plurality of preconfigured or predefined subframe types, or the notification information notifies one of a plurality of preconfigured or predefined combination of subframes, where each combination of subframes includes particular subframe types of respective ones of a plurality of subframes.

In an implementation, the subframe type(s) include(s) one or more of a downlink subframe, an uplink subframe, a special subframe, and a preset subframe.

In an implementation, the determining unit is configured:

when the downlink control channel for scheduling downlink transmission, or the downlink control channel indicating a downlink SPS resource to be released is detected, to determine a subframe type of a subframe in which the downlink control channel is transmitted as a downlink subframe or a special subframe or a preset subframe, or subframe types of N1 subframes starting with the subframe in which the downlink control channel is transmitted as downlink subframes or special subframes or preset subframes, or subframe types of N1 subframes succeeding to the subframe in which the downlink control channel is transmitted as downlink subframes or special subframes or preset subframes, where N1 is a positive integer; and/or when the downlink control channel for scheduling uplink transmission is detected, to determine a subframe type of a subframe scheduled by the downlink control channel as an uplink subframe or a special subframe or a preset subframe, or subframe types of N2 subframes starting with the subframe scheduled by the downlink control channel as uplink subframes or special subframes or preset subframes, where N2 is a positive integer.

In an implementation, the determining unit is configured:

when the downlink control channel is not detected in the current subframe, to assume that a subframe type of the current subframe, or subframe types of N1 subframes starting with the current subframe, or subframe types of N1 subframes succeeding to the current subframe, or a subframe type of a subframe scheduled by a downlink control channel transmitted in the current subframe, or subframe types of N2 subframes stating with the subframe scheduled by the downlink control channel transmitted in the current subframe is or are the same as that of a subframe preceding to the current subframe, or a predefined or preconfigured subframe type(s), or a subframe type(s) determined according to a TDD uplink-downlink configuration of the UE.

In an implementation, the preset resource is each subframe in each radio frame, or a set of subframes notified in configuration signaling.

In an implementation, the detecting unit is configured: to receive common information or UE-specific information over the preset resource.

In an implementation, the detecting unit is configured: to determine a special subframe or a preset subframe in a preset period according to the common information or the UE-specific information.

In an implementation, the special subframe or the preset subframe is divided into a downlink transmission component, an uplink transmission component, and a guard period component as predefined, or notified in configuration signaling.

In an implementation, the preset subframe is a subframe including at least uplink transmission resources and downlink transmission resources.

In an implementation, the configuration signaling is carried in a downlink control channel, or is higher-layer signaling or broadcast signaling.

Figure 9:
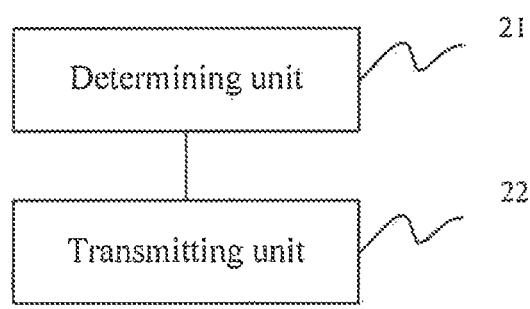
FIG. 9 is a schematic structural diagram of an apparatus for notifying a subframe type according to an embodiment of the invention.

Correspondingly referring to FIG. 9, an apparatus for notifying a subframe type at the eNB side according to an embodiment of the invention includes:

a determining unit 21 is configured to determine a preset resource for transmitting an indicator, where the indicator is used to indicate a UE to determine a subframe type; and a transmitting unit 22 is configured to transmit the indicator over the preset resource.

In an implementation, the transmitting unit is configured:

to transmit a downlink control channel for scheduling downlink transmission, or a downlink control channel indicating a downlink SPS resource to be released, over the preset resource; and/or to transmit a downlink control channel for scheduling uplink transmission, over the preset resource.

In an implementation, the downlink control channel carries notification information to indicate the UE to determine a subframe type of a subframe in which the downlink control channel is transmitted, or subframe types of N1 subframes starting with the subframe in which the downlink control channel is transmitted; or subframe types of N1 subframes succeeding to the subframe in which the downlink control channel is transmitted, or a subframe type of a subframe scheduled by the downlink control channel, or subframe types of N2 subframes starting with the subframe scheduled by the downlink control channel, where N1 and N2 are positive integers.

In an implementation, the notification information notifies one of a plurality of preconfigured or predefined subframe types, or the notification information notifies one of a plurality of preconfigured or predefined combination of subframes, where each combination of subframes includes particular subframe types of respective ones of a plurality of subframes.

In an implementation, the subframe type(s) include(s) one or more of a downlink subframe, an uplink subframe, a special subframe, and a preset subframe.

In an implementation, the transmitting unit is configured:

to transmit the downlink control channel for scheduling downlink transmission, or the downlink control channel indicating a downlink SPS resource to be released, over the preset resource to indicate the UE to determine a subframe type of a subframe in which the downlink control channel is transmitted as a downlink subframe or a special subframe or a preset subframe, or subframe types of N1 subframes starting with the subframe in which the downlink control channel is transmitted as downlink subframes or special subframes or preset subframes, or subframe types of N1 subframes succeeding to the subframe in which the downlink control channel is transmitted as downlink subframes or special subframes or preset subframes, where N1 is a positive integer; and/or to transmit the downlink control channel for scheduling uplink transmission, over the preset resource to indicate the UE to determine a subframe type of a subframe scheduled by the downlink control channel as an uplink subframe or a special subframe or a preset subframe, or subframe types of N2 subframes starting with the subframe scheduled by the downlink control channel as uplink subframes or special subframes or preset subframes, where N2 is a positive integer.

In an implementation, the preset resource is each subframe in each radio frame, or a set of subframes notified in configuration signaling.

In an implementation, the transmitting unit 22 is configured: to transmit the indicator in common information or UE-specific information over the preset resource.

In an implementation, the indicator indicates a special subframe or a preset subframe in a preset period.

In an implementation, the special subframe or the preset subframe is divided into a downlink transmission component, an uplink transmission component, and a guard period component as predefined, or notified in configuration signaling.

In an implementation, the preset subframe is a subframe including at least uplink transmission resources and downlink transmission resources.

In an implementation, the configuration signaling is carried in a downlink control channel, or is higher-layer signaling or broadcast signaling.

Figure 10:
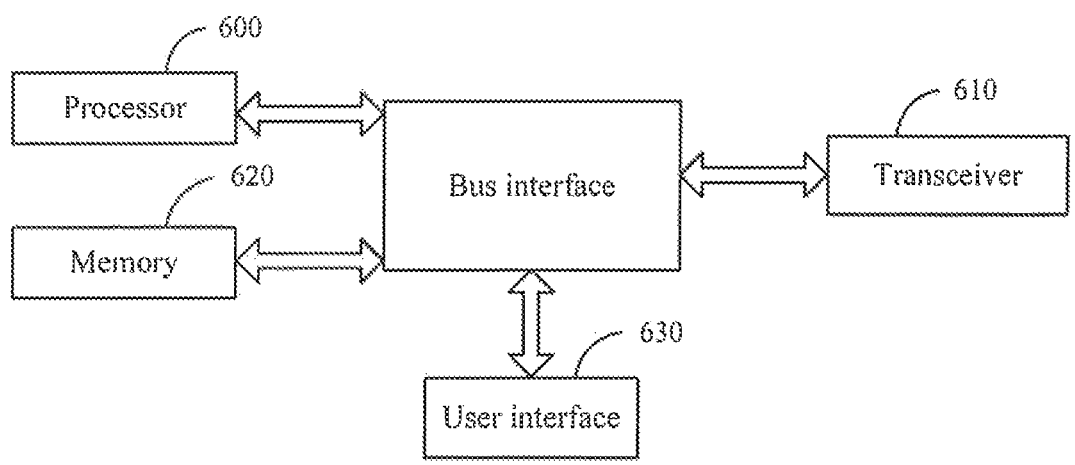
FIG. 10 a schematic structural diagram of another apparatus for determining a subframe type according to an embodiment of the invention.

Referring to FIG. 10, an apparatus for determining a subframe type at the UE side according to an embodiment of the invention includes:

a processor 600 is configured to read program in a memory 620, and to execute the program:

to detect a preset resource for an indicator for determining a subframe type; and to determine a subframe type according to a detection result.

In an implementation, the processor 600 is configured to detect the preset resource for the indicator for determining a subframe type by:

detecting the preset resource for a downlink control channel for scheduling downlink transmission, or a downlink control channel indicating a downlink SPS resource to be released; and/or detecting the preset resource fora downlink control channel for scheduling uplink transmission.

In an implementation, the processor 600 is configured to determine the subframe type according to the detection result by:

when the downlink control channel is detected, determining a subframe type of a subframe in which the downlink control channel is transmitted, or subframe types of N1 subframes starting with the subframe in which the downlink control channel is transmitted, or subframe types of N1 subframes succeeding to the subframe in which the downlink control channel is transmitted, or a subframe type of a subframe scheduled by the downlink control channel, or subframe types of N2 subframes starting with the subframe scheduled by the downlink control channel according to notification information carried in the downlink control channel, where N1 and N2 are positive integers.

In an implementation, the notification information notifies one of a plurality of preconfigured or predefined subframe types, or the notification information notifies one of a plurality of preconfigured or predefined combination of subframes, where each combination of subframes includes particular subframe types of respective ones of a plurality of subframes.

In an implementation, the subframe type(s) include(s) one or more of a downlink subframe, an uplink subframe, a special subframe, and a preset subframe.

In an implementation, the processor 600 is configured to determine the subframe type according to the detection result by:

when the downlink control channel for scheduling downlink transmission, or the downlink control channel indicating a downlink SPS resource to be released is detected, determining a subframe type of a subframe in which the downlink control channel is transmitted as a downlink subframe or a special subframe or a preset subframe, or subframe types of N1 subframes starting with the subframe in which the downlink control channel is transmitted as downlink subframes or special subframes or preset subframes, or subframe types of N1 subframes succeeding to the subframe in which the downlink control channel is transmitted as downlink subframes or special subframes or preset subframes, where N1 is a positive integer; and/or when the downlink control channel for scheduling uplink transmission is detected, determining a subframe type of a subframe scheduled by the downlink control channel as an uplink subframe or a special subframe or a preset subframe, or subframe types of N2 subframes starting with the subframe scheduled by the downlink control channel as uplink subframes or special subframes or preset subframes, where N2 is a positive integer.

In an implementation, the processor 600 is configured to determine the subframe type according to the detection result by:

when the downlink control channel is not detected in the current subframe, assuming that a subframe type of the current subframe, or subframe types of N1 subframes starting with the current subframe, or subframe types of N1 subframes succeeding to the current subframe, or a subframe type of a subframe scheduled by a downlink control channel transmitted in the current subframe, or subframe types of N2 subframes stating with the subframe scheduled by the downlink control channel transmitted in the current subframe is or are the same as that of a subframe preceding to the current subframe, or a predefined or preconfigured subframe type(s), or a subframe type(s) determined according to a TDD uplink-downlink configuration of the UE.

In an implementation, the preset resource is each subframe in each radio frame, or a set of subframes notified in configuration signaling.

In an implementation, the processor 600 is configured to detect the preset resource for the indicator for determining a subframe type by receiving common information or UE-specific information over the preset resource.

In an implementation, the processor 600 is configured to determine the subframe type according to the detection result by determining a special subframe or a preset subframe in a preset period according to the common information or the UE-specific information.

In an implementation, the special subframe or the preset subframe is divided into a downlink transmission component, an uplink transmission component, and a guard period component as predefined, or notified in configuration signaling.

In an implementation, the preset subframe is a subframe including at least uplink transmission resources and downlink transmission resources.

In an implementation, the configuration signaling is carried in a downlink control channel, or is higher-layer signaling or broadcast signaling.

A transceiver 610 is configured to, receive and transmit data under the control of the processor 600.

Here in FIG. 10, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a receiver and a transmitter, which are units for communication with various other devices over a transmission medium. For different user equipments, the user interface 630 can also be an interface via which desirable devices can be connected internally and externally, and the connected devices include but will not be limited to a keypad, a monitor, a speaker, a microphone, a joystick, etc.

The processor 600 is responsible for managing the bus architecture and performing normal processes, and the memory 620 can store data for use by the processor 600 in performing the operations.

Figure 11:
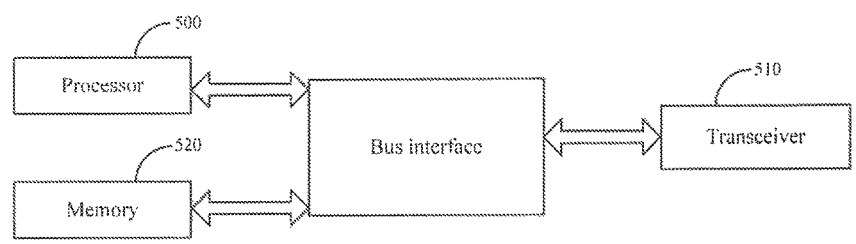
FIG. 11 is a schematic structural diagram of another apparatus for notifying a subframe type according to an embodiment of the invention.

Referring to FIG. 11, another apparatus for notifying a subframe type at the eNB side according to an embodiment of the invention includes:

A processor 500 is configured to read program in a memory 520, and to execute the program:

to determine a preset resource for transmitting an indicator, where the indicator is used to indicate a UE to determine a subframe type; and to transmit the indicator over the preset resource through a transceiver 510.

In an implementation, the processor 500 is configured to transmit the indicator over the preset resource through the transceiver 510 by:

transmitting a downlink control channel for scheduling downlink transmission, or a downlink control channel indicating a downlink SPS resource to be released, over the preset resource; and/or transmitting a downlink control channel for scheduling uplink transmission, over the preset resource.

In an implementation, the downlink control channel carries notification information to indicate the UE to determine a subframe type of a subframe in which the downlink control channel is transmitted, or subframe types of N1 subframes starting with the subframe in which the downlink control channel is transmitted, or subframe types of N1 subframes succeeding to the subframe in which the downlink control channel is transmitted, or a subframe type of a subframe scheduled by the downlink control channel, or subframe types of N2 subframes starting with the subframe scheduled by the downlink control channel, where N1 and N2 are positive integers.

In an implementation, the notification information notifies one of a plurality of preconfigured or predefined subframe types, or the notification information notifies one of a plurality of preconfigured or predefined combination of subframes, where each combination of subframes includes particular subframe type's of respective ones of a plurality of subframes.

In an implementation, the subframe type(s) include(s) one or more of a downlink subframe, an uplink subframe, a special subframe, and a preset subframe.

In an implementation, the processor 500 is configured to transmit the indicator over the preset resource through the transceiver 510 by:

transmitting the downlink control channel for scheduling downlink transmission, or the downlink control channel indicating a downlink SPS resource to be released, over the preset resource to indicate the UE to determine a subframe type of a subframe in which the downlink control channel is transmitted as a downlink subframe or a special subframe or a preset subframe, or subframe types of N1 subframes starting with the subframe in which the downlink control channel is transmitted as downlink subframes or special subframes or preset subframes, or subframe types of N1 subframes succeeding to the subframe in which the downlink control channel is transmitted as downlink subframes or special subframes or preset subframes, where N1 is a positive integer; and/or transmitting the downlink control channel for scheduling uplink transmission, over the preset resource to indicate the UE to determine a subframe type of a subframe scheduled by the downlink control channel as an uplink subframe or a special subframe or a preset subframe, or subframe types of N2 subframes starting with the subframe scheduled by the downlink control channel as uplink subframes or special subframes or preset subframes, where N2 is a positive integer.

In an implementation, the preset resource is each subframe in each radio frame, or a set of subframes notified in configuration signaling.

In an implementation, the processor 500 is configured to transmit the indicator over the preset resource through the transceiver 510 by to transmitting the indicator in common information or UE-specific information over the preset resource.

In an implementation, the indicator indicates a special subframe or a preset subframe in a preset period.

In an implementation, the special subframe or the preset subframe is divided into a downlink transmission component, an uplink transmission component, and a guard period component as predefined, or notified in configuration signaling.

In an implementation, the preset subframe is a subframe including at least uplink transmission resources and downlink transmission resources.

In an implementation, the configuration signaling is carried in a downlink control channel, or is higher-layer signaling or broadcast signaling.

T transceiver 510 is configured to, receive and transmit data under the control of the processor 500.

Here in FIG. 11, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a receiver and a transmitter, which are units for communication with various other devices over a transmission medium. The processor 500 is responsible for managing the bus architecture and performing normal processes, and the memory 520 can store data for use by the processor 500 in performing the operations.

The processor as referred to in the embodiments above of the invention can be a Central Processing Unit (CPU), an Application-Specific Integrated Circuit (ASIC), a Field-Programmable Gate Array (FPGA), or a Complex Programmable Logic Device (CPLD).

In summary, in the technical solutions according to the embodiments of the invention, a subframe type(s) of a subframe corresponding to a received DL grant and/or UL grant, or N subframes starting with the subframe corresponding to the grant, or N subframes succeeding to the subframe corresponding to the grant is or are determined according to the grant, or it is notified according to common information or UE-specific information which subframes in a period are special subframes, so that the UE can determine the subframe type(s) dynamically to thereby further adapt the subframe types flexibly to a varying demand for traffic transmission, thus improving the transmission efficiency of the system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention, It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer, or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining a subframe type, the method comprising:

determining a first subframe, wherein a subframe type of the first subframe is an uplink subframe or a downlink subframe in an existing Long Term Evolution (LTE) Frequency Division Duplex (FDD) system;

receiving UE-specific information in a preset resource at a specific period, wherein the UE-specific information is downlink control information (DCI), the UE-specific information is used for indicating that a subframe type of the first subframe is a special subframe or a preset subframe and notifying a downlink transmission component and an uplink transmission component comprised in the special subframe or the preset subframe, and the preset resource is a set of subframes notified in configuration signaling;

determining that the subframe type of the first subframe which is the uplink subframe or the downlink subframe is changed to the subframe type of the special subframe or the preset subframe comprising the downlink transmission component and the uplink transmission component; and determining, according to the UE-specific information, the special subframe or the preset subframe in a preset period and an allocation scheme of the downlink transmission component and the uplink transmission component in the special subframe or the preset subframe, wherein the special subframe or the preset subframe is a subframe comprising at least uplink transmission resources and downlink transmission resources.

2. The method according to claim 1, wherein a guard period component further comprised in the special subframe or the preset subframe is notified by the DCI.

3. A method for notifying a subframe type, the method comprising:

determining a first subframe, wherein a subframe type of the first subframe is an uplink subframe or a downlink subframe in an existing Long Term Evolution (LTE) Frequency Division Duplex (FDD) system;

determining a preset resource for transmitting UE-specific information, wherein the UE-specific information is downlink control information (DCI), the UE-specific information is used to indicate a UE to determine that a subframe type of the first subframe is a special subframe or a preset subframe and is used to notify a downlink transmission component and an uplink transmission component comprised in the special subframe or the preset subframe, and the preset resource is a set of subframes notified in configuration signaling;

determining that the subframe type of the first subframe which is the uplink subframe or the downlink subframe is changed to the subframe type of the special subframe or the preset subframe comprising the downlink transmission component and the uplink transmission component; and transmitting the UE-specific information over the preset resource at a specific period, wherein the UE-specific information indicates the special subframe or the preset subframe in a preset period and notifies an allocation scheme of the downlink transmission component and the uplink transmission component in the special subframe or the preset subframe, and the special subframe or the preset subframe is a subframe comprising at least uplink transmission resources and downlink transmission resources.

4. The method according to claim 3, wherein a guard period component further comprised in the special subframe or the preset subframe is notified in the DCI.

5. An apparatus for determining a subframe type, the apparatus comprising a processor and a memory, wherein the processor is configured to read and execute a program in the memory:

to determine a first subframe, wherein a subframe type of the first subframe is an uplink subframe or a downlink subframe in an existing Long Term Evolution (LTE) Frequency Division Duplex (FDD) system;

to receive UE-specific information in a preset resource at a specific period, wherein the UE-specific information is downlink control information (DCI), the UE-specific information is used for indicating that a subframe type of the first subframe is a special subframe or a preset subframe and notifying a downlink transmission component and an uplink transmission component comprised in the special subframe or the preset subframe, and the preset resource is a set of subframes notified in configuration signaling;

to determine that the subframe type of the first subframe which is the uplink subframe or the downlink subframe is changed to the subframe type of the special subframe or the preset subframe comprising the downlink transmission component and the uplink transmission component; and to determine, according to the UE-specific information, the special subframe or the preset subframe in a preset period and an allocation scheme of the downlink transmission component and the uplink transmission component in the special subframe or the preset subframe, wherein the special subframe or the preset subframe is a subframe comprising at least uplink transmission resources and downlink transmission resources.

6. The apparatus according to claim 5, wherein a guard period component further comprised in the special subframe or the preset subframe is notified by the DCI.

7. An apparatus for notifying a subframe type, the apparatus comprising a processor and a memory, wherein the processor is configured to read and execute a program in the memory:

to determine a first subframe, wherein a subframe type of the first subframe is an uplink subframe or a downlink subframe in an existing Long Term Evolution (LTE) Frequency Division Duplex (FDD) system;

to determine a preset resource for transmitting UE-specific information, wherein the UE-specific information is downlink control information (DCI), the UE-specific information is used to indicate a UE to determine that a subframe type of the first subframe is a special subframe or a preset subframe and is used to notify a downlink transmission component and an uplink transmission component comprised in the special subframe or the preset subframe, and the preset resource is a set of subframes notified in configuration signaling;

to determine that the subframe type of the first subframe which is the uplink subframe or the downlink subframe is changed to the subframe type of the special subframe or the preset subframe comprising the downlink transmission component and the uplink transmission component; and to transmit the UE-specific information over the preset resource at a specific period, wherein the UE-specific information indicates the special subframe or the preset subframe in a preset period and notifies an allocation scheme of the downlink transmission component and the uplink transmission component in the special subframe or the preset subframe, and the special subframe or the preset subframe is a subframe comprising at least uplink transmission resources and downlink transmission resources.

8. The apparatus according to claim 7, wherein a guard period component further comprised in the special subframe or the preset subframe is notified in the DCI.

* * * * *